J. S. CARSON.

Bale-Tie.

No. 6,468. Reissued June 1, 1875.

Attest.

Jeremiah F. Lovhig

Inventor.

John S. Carson

Hatch & Parkinson

THE MORRIS PETERS CO., PHOTO-LITHO., WASHINGTON, D. C.

UNITED STATES PATENT OFFICE.

JOHN S. CARSON, OF BROOKHAVEN, MISSISSIPPI, ASSIGNOR TO WARREN L. CARSON, OF MEMPHIS, TENNESSEE.

IMPROVEMENT IN BALE-TIES.

Specification forming part of Letters Patent No. 87,541, dated March 9, 1869; reissue No. 6,468, dated June 1, 1875; application filed May 12, 1875.

*To all whom it may concern:*

Be it known that I, JOHN S. CARSON, of Brookhaven, in the county of Lincoln and State of Mississippi, have invented certain Improvements in Cotton-Bale Ties, of which the following is a specification:

My invention relates to ties for cotton and other bales, and combines cheapness and simplicity with security, and affords great facilities for re-pressing. I employ a strap or band passing around the bale, a link for connecting the ends of the strap, one of said ends being attached to the link, and the other being doubled into a loop, which loop is passed through the link, and a hook for engaging in the loop on the free end of the strap to prevent its withdrawal through the link.

Figure 1:
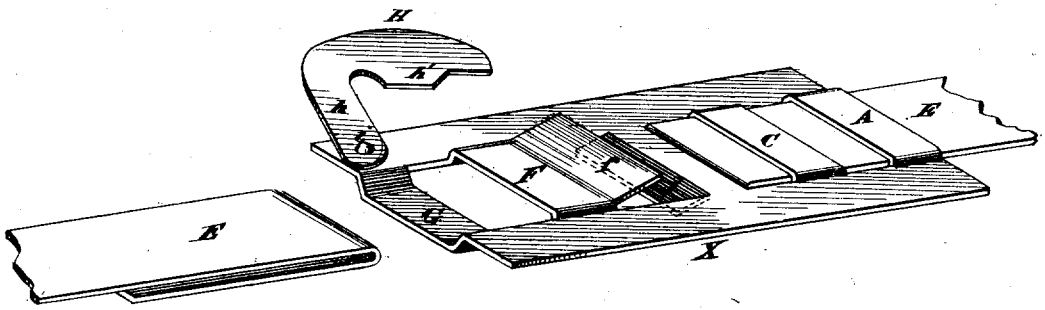
Figure 2:
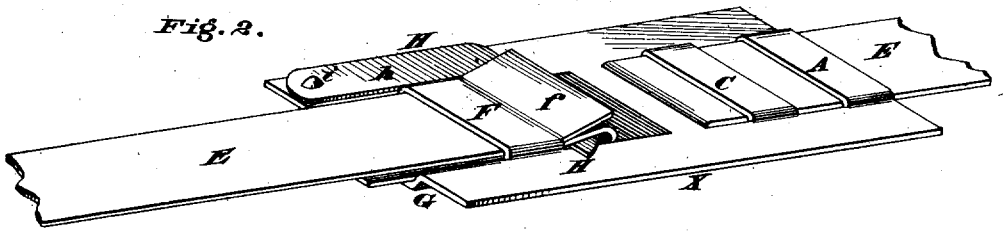
Figure 3:
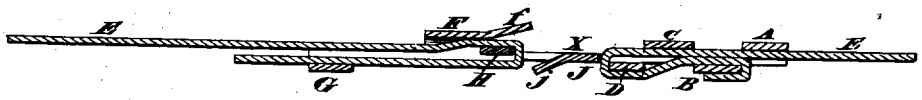

Figure 1 is a perspective view of one of my ties when open. Fig. 2 is a perspective view when closed, and Fig. 3 is a longitudinal section when closed.

The tie, as shown in the drawing, is made from a rectangular piece of metal, so formed as to have near one end a bar, around which one end of the band E is permanently secured. The other end of the band E, after being passed around the bale, is bent over to form a loop, and the loop thus formed is passed up through the plate or link. The hook is pivoted or otherwise secured to the tie in such a position that, when the loop in the free end of the band E is passed through the plate, the point of the hook may be passed through the loop in the end of the band, and resting on the opposite side of the plate. The hook, engaging in the bight of the band, prevents its withdrawal, especially after the pressure is removed from the bale. To further prevent the accidental disengagement of the hook a bulge or projection, *h'*, may be provided, which, when the band is under tension, may engage within a loop, *f*, and prevent retrogade movement of the hook. The plate may also have a wing, *j*, projecting downward, to guide the free end of the band in the act of insertion.

What I claim is—

1. In a metallic tie for baling purposes, a hook attached to the tie for the purpose of completing the connection between the ends of the same, and thereby preventing the release of the bale.

2. The combination, in a metallic tie for baling purposes, of a band passing around the bale, a link to connect the two ends of the band, having an opening, through which the looped end of the band may be passed, and a hook secured to some portion of the tie, and so adjusted that it may engage the loop of the free end of the band after it has been passed through the opening in the link, and thereby prevent the withdrawal of the band.

JOHN S. CARSON.

Witnesses:
H. K. FULLER,
S. PARR.